April 29, 1969     K. L. JOHNSON     3,441,073

LOCKNUT

Original Filed July 31, 1967     Sheet _1_ of 3

INVENTOR.
KENNETH L. JOHNSON

BY Benjamin W. Colman

ATTORNEY

April 29, 1969 K. L. JOHNSON 3,441,073
LOCKNUT
Original Filed July 31, 1967 Sheet 3 of 3

INVENTOR.
KENNETH L. JOHNSON
BY Benjamin W. Colman
ATTORNEY

United States Patent Office 3,441,073
Patented Apr. 29, 1969

3,441,073
LOCKNUT
Kenneth L. Johnson, Pitcairn, Monroeville, Pa., assignor, by mesne assignments, to Modulus Corporation, Beechwood, Ohio, a corporation of Delaware
Continuation of applications Ser. No. 657,277, and Ser. No. 657,289, July 31, 1967. This application May 13, 1968, Ser. No. 728,636
Int. Cl. F16b 39/02, 39/28
U.S. Cl. 151—21     10 Claims

ABSTRACT OF THE DISCLOSURE

This invention pertains to a prevailing torque locknut having a crown extending from the nut body at one end thereof, the outer surface configuration of the crown being defined by a circle of revolution of a generally convexly curved line, the crown surface being substantially convex in contour, and flattened areas or indentations impacted in such surface whereby portions of the outer surface of the crown zone are impacted inwardly at such an attitude with respect to the crown surface as to produce a substantial deformation of thread portions of the nut substantially in the radial path of the forces of impaction. The attitude of the flattened areas or indentations, their angular relationship to the crown surface, their location on the crown and their extent are variable, as is the curved configuration of the crown itself.

---

This application is a continuation of my earlier filed applications Ser. Nos. 657,277 and 657,289, filed July 31, 1967, entitled "Lock Nut" both of which are now abandoned.

The invention, in general, involves the production of a prevailing torque locknut having a nut body with a plurality of side walls, a base at one end of the body and a crown at the other end substantially in the form of a convex zone. After the bore of the nut body has been tapped or threaded to form an intermediate nut, i.e., a prevailing torque locknut in an intermediate stage of fabrication, the crown surface is struck with a tool traveling axially of the nut to form a plurality of flattened areas or indentations in the crown such that portions of the threads that lie generally in the radial path of the resultant forces generated by the impaction, are deformed radially inwardly and to some degree axially of the threaded bore.

Prevailing torque nuts that have a crown portion extending uniformly axially upwardly of the polygonally shaped portion of the nut body and that have thread deforming impactions equally spaced on this crown portion are known in the art. Such prevailing torque nuts have a generally cone-shaped crown portion, the surface of which extends from the outer peripheral edge of the nut body in a direct straight line to one end of the threaded bore. In all such prior art, the peripheral edge of the crown at the nut body and the periphery of the threaded bore are connected by a straight line. The impactions are formed as a final operation by a tool that travels axially of the threaded bore and which has indenting portions or areas that describe an included angle which is closely approximately that of the crown of the nut. I have found for reasons described hereinbelow that it is extremely difficult to mass produce prevailing torque nuts of this configuration that have uniform prevailing torque characteristics from one nut to the other, or throughout a given production lot.

The fabrication of prevailing torque locknuts in cold heading equipment such as a cold nut former proceeds in several successive stages. First, a round cross sectional bar of steel is introduced into the cold nut former and a small portion or slug is cut off by shearing. The slug is automatically transferred, in the same machine, successively to a number of dies into which it is squeezed by tools to form a nut body having side walls (which may have any plural number) and to dimple or start the hole by formation of a depression axially of the partially formed nut body. The slug is then automatically passed, in the same machine, to a die into which the part is pressed to more nearly complete the dimensional configuration of the side walls and to form the crown of the nut. The hole in the body is also further advanced in this stage. The final stage in this machine is a transfer of the nut body to a die for piercing therethrough, wherein the central bore is formed by punching out the slug of reduced thickness that was left during the forming stages. All of these several steps or stages of cold nut forming are taking place simultaneously in sequential progression at the rate of from about 40 to 100 strokes per minute depending on the size of the nut, the larger sizes being fabricated at a slower rate than the smaller sizes. The tapping operation is performed in another machine, and the nut intermediate is completed by tapping the pierced nut body. The now completely formed nut intermediates are then placed in a third machine for application of the indenting tool whereby the crown is impacted in a plurality of zones to provide the inwardly deformed thread portions that converts the nut intermediate into a prevailing torque lock nut. The speed of this machine presently is normally at a rate of about 120 impacting strokes per minute for sizes up to and including a ½″ thread bore, all of the impactions being made simultaneously by a single tool having the requisite form of impacting lugs. It will therefore be appreciated that such high speed processing and fabrication of metal is subject to a number of imprecise variables. The one with which this invention is particularly concerned is the attitude of the crown portion in relation to the side walls and/or the threaded bore of the nut and its relation to the fixed attitude of the impacting surfaces of the tool forming the locknut.

I have found, however, that in order to produce locknuts that consistently meet certain specified and/or required characteristics of prevailing torque, it is necessary to closely control the direction and the point of application of the impacting and deforming force that it applied to the crown of the nut body. I have also found that a more controlled or controllable character of prevailing torque is obtainable if the area in the crown that is adjacent either the outer periphery of the nut body or the area that includes the top thread of the bore is not impacted more deeply than is the area generally medially between these two extremes.

In the production of prevailing torque nut intermediates as described above, the variables of material hardness and/or the length of the cutoff slug produce varying conditions of underfill or overfill in the crown portion. Such variables in turn produce variables in the angular relationship of the crown portion to the threaded bore of the nut intermediate. Thus, in the succeeding impacting operation by a tool that has a fixed relation of angularity in its impacting portion, the application of impacting forces may occur initially at either the outer peripheral edge of the crown or at the crown portion that includes the entire top thread of the nut. For example, in such cases wherein the included angle of the crown of the nut intermediate is intended to be 90° and the included angle of the impacting tool is fixed also at 90°, the optimum conditions of angularity of the crown portion would produce an impaction that is substantially aligned with the surface of the crown portion. In the case of a short cutoff of material in the nut forming process, a condition of underfill at the peripheral edge of the crown results. This condition produces a crown portion having an included angle somewhat less than the optimum as, for instance, about 80 or 85°, in which case the impacting lugs of the tool having the above-mentioned fixed included angle of 90° would effect an impaction that is deeper in the area that includes the top thread of the nut intermediate.

In such cases wherein the cutoff is somewhat longer than the optimum in the cold nut forming operation, a condition of overfill is produced which causes the included angle of the crown of the nut intermediate to be greater than 90°. In this condition, the impacting lugs would produce an impaction that is deepest at the outer or upper peripheral edge of the crown. Thus, we have a situation wherein on the one hand, a nut intermediate is impacted more deeply at one extreme (the upper) and on the other, at the opposite extreme (the lower) of the crown surface. The two extremes that are unavoidably met during a mass large volume production run of nut intermediates on a single nut former produce prevailing torque locknuts that have widely varying torque characteristics.

I have found further that by producing a prevailing torque nut intermediate whose crown portion has an outwardly extending curved convexity between its outer peripheral edge at the side walls and the area that includes the countersink and top thread of the threaded bore obviates the above described inconsistencies. Thus, the critical nature of the relationship between the included angle of the impacting tool and the included angle of the crown portion of the nut intermediate, that is implicit in the prior art structures, is minimized, and a prevailing torque lock nut having more uniform torque characteristics is reproducible under mass production conditions.

It is an object of the invention to provide a prevailing torque locknut structure that readily lends itself to mass production methods and conditions and has a high degree of substantially uniform, relatively consistent and reliable prevailing torque characteristics. Another object is to provide such a locknut having a plurality of spaced thread deforming impactions in a convexly curved shaped nut crown. A further object is to provide such a locknut having thread deforming impactions in a convexly curved shaped nut crown that do not extend as deeply into the crown portion at either the crown end peripheral edge of the threaded bore or at the outer peripheral edge of the nut body as they do at the medial portion of the impaction.

These and additional objects of the invention and features of construction will become more apparent from the description given below in which the terms employed are terms of description and not of limitation. Preferred embodiments of the invention are described in the specification and illustrated in the several views of the accompanying drawings. Reference is made to such drawings annexed hereto and forming an integral part of the specification in which:

Figure 1:
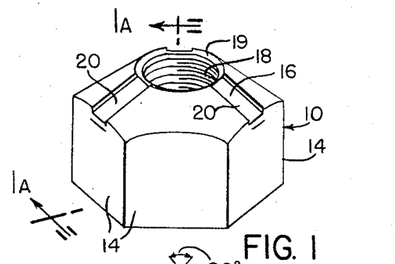
FIGURE 1 is a perspective view of a prevailing torque nut of the prior art showing conditions of optimum or intended angular relationship between the indenting tool and the crown portion of the nut intermediate.

Referring now to the several views of the drawings, FIGURE 1 illustrates a locknut of the prior art structure showing a condition wherein the desired optimum angularity of the nut intermediate exists and the predetermined angular relationship of the impacting tool—namely 90° included angle—also exists. The resulting indentation that is produced in the nut intermediate will be substantially parallel with the surface of the crown portion and the depth of such indentation will be substantially uniform along its length. Such optimum situation will produce a prevailing torque nut that fulfills the predetermined requisites of prevailing torque characteristics.

Figures 2, 3, 4, 5, 6, 7, 8, 9:
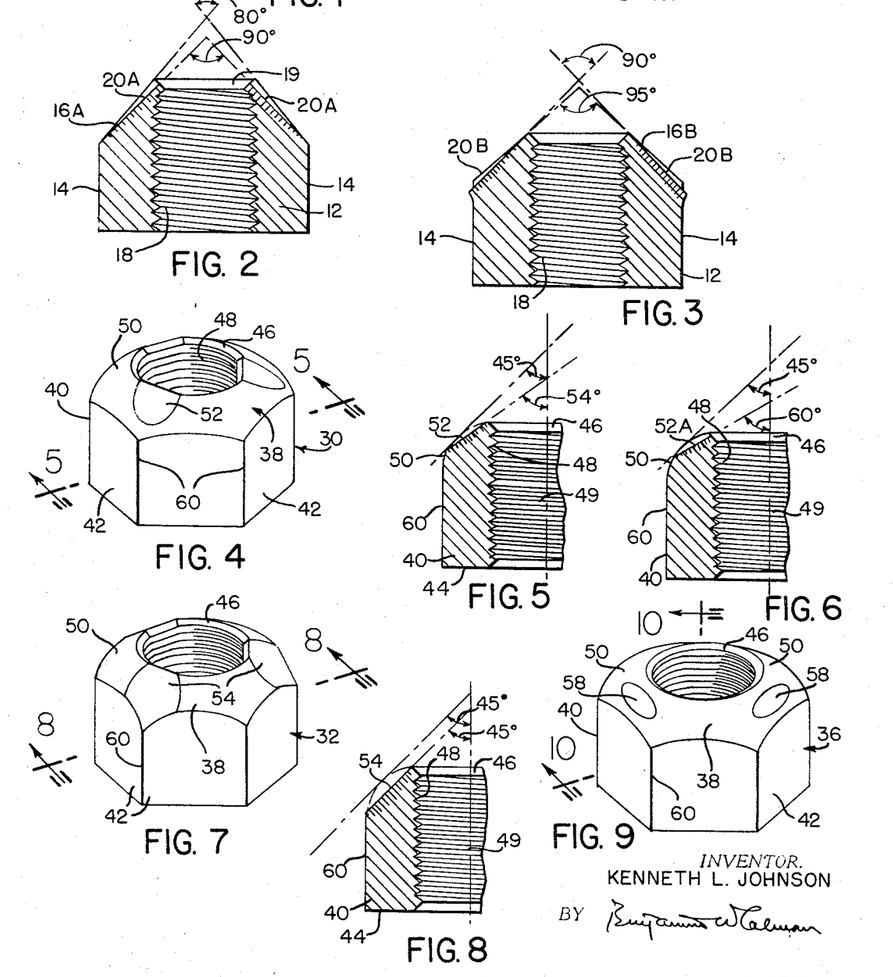
FIGURE 2 is a cross sectional elevation of a similar prevailing torque nut of the prior art showing the aforementioned condition of underfill and the resulting smaller included angle of the nut intermediate with the resulting angular relationship to the indenting tool.
FIGURE 3 is a cross sectional elevation of another similar prevailing torque nut of the prior art in which the aforementioned condition of overfill exists, together with the resulting larger included angle of the crown portion and its relation to the fixed angle of the indenting tool.
FIGURE 4 is a perspective view of one embodiment of a prevailing torque locknut embodying the invention.
FIGURE 5 is an enlarged fragmentary vertical sectional view taken substantially on the line 5—5 of FIGURE 4.
FIGURE 6 is a fragmentary radial sectional view substantially similar to FIGURE 5, but showing the flattened portion partially penetrating the countersink at the crown end of the locknut.
FIGURE 7 is a perspective view of a slightly modified form of the nut illustrated in FIGURE 4.
FIGURE 8 is an enlarged fragmentary vertical sectional view taken substantially on the line 8—8 of FIGURE 7.
FIGURE 9 is a perspective view of another modified form of the locknut illustrated in FIGURE 4.

Referring next to FIGURE 2, it will be seen that with this prevailing torque locknut of the prior art the condition of underfill in the nut forming operation—as previously mentioned—produces a situation wherein the impacting tool, having a fixed angular relationship between the impacting portions of 90° included angle penetrates more deeply at the upper peripheral edge of the threaded bore including the topmost thread. Such condition produces a prevailing torque nut wherein the topmost thread is excessively deformed and the threads that are located more deeply in the threaded bore are relatively undistorted. Such a prevailing torque locknut would display characteristics of an extremely high prevailing torque on its initial application on a mating threaded male member. Such high initial prevailing torques are quickly dissipated by the plastic deformation resulting from extremely high unit pressures and the nut will not provide the required minimum prevailing torque on successive reapplications.

FIGURE 3 illustrates a prevailing torque locknut of the prior art in which the aforementioned condition of overfill exists in the nut intermediate. In this situation, the included angle of the intermediate is of the order of some 95° to 100°, and when the tapered crown portion is struck by the impacting tool having the fixed angular relationship of 90° included angle, the indentation produced has a greater depth at the outer peripheral area of the crown portion. The resultant forces derived from such a situation thus occur at a point that is more remote from the threaded bore and are therefore directed more deeply into the nut body. The resulting prevailing torque locknut is one where very little effective deformation of the threads occurs, and, to whatever extent that it does occur, it may be so close to the opposite end of the threaded bore as to preclude the admittance of a mating threaded male member.

Thus it may be seen that in the mass production of prevailing torque locknuts of the prior art that rely upon the impaction of equally spaced areas upon a continuously upwardly tapering radially inwardly extending crown surface, the variables that are unavoidably encountered in the mass production of the nut intermediate—while appearing to be minute and trifling in themselves—result in a mixture of finished prdoucts having widely varying torque characteristics.

Figure 1A:
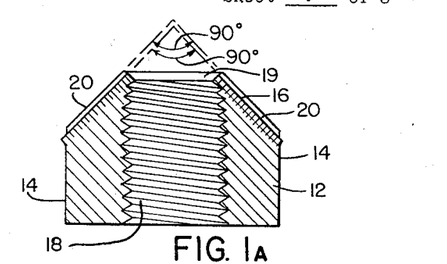
FIGURE 1A is a vertical sectional view taken substantially on the line 1A—1A of FIGURE 1.

As shown particularly in FIGURES 1, 1A, 2 and 3, in respect to prior art structures having indentations in a tapered crown at one end of the nut body, the prevailing torque locknut 10 comprises generally a nut body 12, side walls 14, a tapered crown 16 extending from the side walls to the threaded bore 18 or to a countersink 19 at the upper end of such threaded bore. It will be noted that the bottom or base plane of the indentations 20 are disposed substantially parallel to the crown surface. The structure illustrated in FIGURES 1 and 1A is optimum in its structural features, i.e., if all conditions of production are substantially ideal, then a prevailing torque locknut of the design shown in FIGURE 1 would probaby be produced. However, it is much more likely that the structural configuration illustrated in FIGURE 2 woud be made, wherein the tapered crown is at a steeper included angle because of an underfill condition in the nut intermediate tooling, in which event the indentations 20a are now substantially located at and directed to the top thread of the bore 18 and only a portion of the crown surface 16a has been indented. In contrast, an overfill condition generally produces a locknut such as is illustrated in FIGURE 3, wherein the indentations 20b are now disposed at the outer peripheral edge of the crown surface 16b which has an included tapered angle greater than the 90° of the optimum structure illustrated in FIGURE 1. In such event, depending upon the extent of overfill and consequent increase in the included angle of the tapered crown, the amount of overhang at the side walls occasioned by the indentations passing into the side walls may be so excessive as to preclude the use of conventional wrenching tools for engaging such nuts.

In a prevailing torque locknut structure made in accordance witht the principles of this invention, the continuously upwardly radially inwardly extending crown surface (taken from the side walls to the crown end of the nut) is so constructed and designed as to present in cross sectional elevation an outwardly extending curved convexity intermediate the lower peripheral boundaries of the crown portion and the upper periphery at the threaded bore. In other words, with reference to a straight line drawn between the outer peripheral contour of the nut body and the peripheral edge of the threaded bore, the crown surface of the nut of this invention describes a substantial outwardly extending curved convexity, defined by a generally convexly curved line of revolution about the axis of the nut bore.

Figures 10, 11, 12, 13, 14, 15, 16, 17, 18:
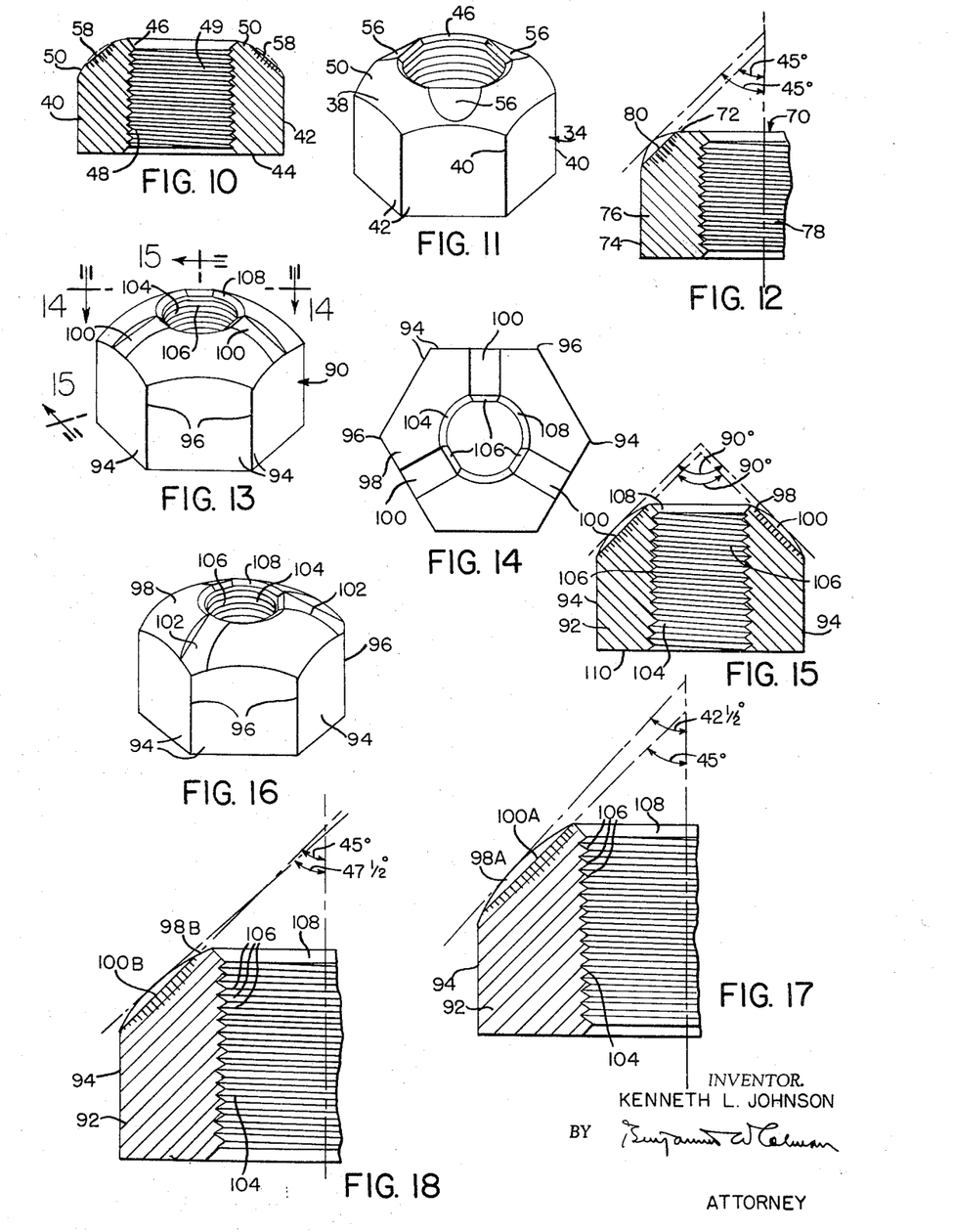
FIGURE 10 is a transverse vertical sectional view taken substantially on the line 10—10 of FIGURE 9.
FIGURE 11 is a perspective view of yet another modified form of the lock nut illustrated in FIGURE 4.
FIGURE 12 is a fragmentary radial sectional view substantially similar to FIGURE 10, but showing a convexly curved crown having a changing radius of curvature according to a hyperbolic equation.
FIGURE 13 is a perspective view of another embodiment of a prevailing torque lock nut of this invention.
FIGURE 14 is a top plan view taken substantially on the line 14—14 of FIGURE 13.
FIGURE 15 is a vertical radial sectional view taken substantially on the line 15—15 of FIGURE 13.
FIGURE 16 is a perspective view of a locknut similar to the nut shown in FIGURE 13 but illustrating a slight modification in respect to the location of the indentations.
FIGURES 17 and 18 are fragmentary vertical radial sectional views of locknuts having convexly curved crowns illustrating the extent of the crown zone, the attitude and posture of the indentations in each of such crown zones in relationship to the attitude of the crown surface, as underfill (FIGURE 17) or overfill (FIGURE 18) of the nut intermediate tooling may produce, and the effect of impaction upon the threads by tooling disposed at the same impacting angle in each case.

As may be seen by referring to FIGURES 17 and 18, the point of initial contact between the impacting tool and the projected surface of the crown varies very little as the attitude of the crown surface varies. Thus, the point of origin of the resultant forces varies very little from one extreme condition to the other. It being obvious that the resulting impaction can never penetrate more deeply than at the point of initial contact of the impacting tool, the generally medial area of impaction, the prerequisities to the attainment of the several objectives of this invention are met even when the variance in attitude of the crown surface, resulting from the aforementioned conditions of underfill or overfill, or other undesirable conditions that are the result of die wear, etc., are encountered.

As a result of such variation in the attitudes of the convexly curved crown and in the posture of the impaction by an impacting tool having a predetermined and fixed angular relationship of the impacting portions thereof, the resulting product may present varying appearances. Such variation in outward appearance is of little consequence in view of the fact that the overall objectives of attaining substantially uniform thread deformation and uniform torque characteristics resulting therefrom are met.

Again referring to the several views of the drawing, in one embodiment of the invention, it will be seen that the locknuts 30 (FIGURE 4), 32 (FIGURE 7), 34 (FIGURE 11), and 36 (FIGURE 9), are each provided with a substantially convexly curved spherical crown zone 38 defined by the circle of revolution of a convexly curved outwardly projecting line revolved about the axis of the nut body 40, in each instance having side walls 42, a base 44, an upper crown end 46 and a threaded bore 48 comprising helical threads 49. The crown surface 50 in each instance is convexly curved from the outer side walls 42 to the crown end 46, which is generally in the form of a countersink. To form the deformed threads that produce the locking torque and locking engagement with stud threads, flattened areas are formed in the crown surface 50 in each instance by an impacting tool having lugs therein arranged circumferentially of the tool so that, by an axial thrust, impaction upon and in the crown surface produces the spaced apart flattened areas 52 in the nut 30, 54 in the nut 32, 56 in the nut 34, and 58 in the nut 36.

The flattened areas 52, 54, 56 and 58 each have their circumscribing edges substantially blending with the crown surface 50, the planar surface of the flattened areas lying below the crown surface of the nut intermediate before its impaction. In the nut 30, the flattened areas 52 have an edge disposed adjacent the crown end 46, but such areas 52 do not extend to the side walls 42 or to the corners 60 formed by the side walls. The flattened areas 54 in the nut 32 extend from the crown end 46 to the side walls 42 and the corners 60. In the nut 34 the flattened areas 56 are similar to the flattened areas 52 of nut 30, but are disposed approximately central of alternate side walls 42, i.e., not at the corners 60 of the nut.

In the nut 36, the flattened areas 58 are formed in the crown surface 50 intermediate the crown end 46 and the side walls 42 or the corners 60. The depth of the flattened areas in the crown surface 50, in each instance substantially determines the compass or perimeter of such areas, which may be slightly greater than or less than as shown in the several views of the drawing.

Whereas the locknut 30 illustrated in FIGURES 4 and 5 has the upper edge of the flattened portions 52 aligned substantially with the top edge of the crown 46, the flattened areas 52a in FIGURE 6 are disposed at a slightly greater angle to the axis of the threaded bore, whereby the upper edge of the flattened areas penetrates into the crown end countersink 46, effecting a slight distortion of the top thread of the nut. The greater penetration into the crown 50 is nevertheless effected in a region intermediate and generally medially of the upper and lower peripheries of the flattened areas 52a.

The flattened areas in each instance are spaced circumferentially of and substantially equally apart in the crown zone 38 of the respective nuts. It is to be understood that such equal spacing may not always be desirable nor required, and the flattened areas, therefore, may be equally or unequally spaced apart in order to effect the desired or required locking torque characteristics. Although in each instance the number of flattened areas in the nuts described and illustrated are shown to be three in number, such number may be less than or more than three. The significant factor is that the flattened areas are impacted by the tool lugs within the upper and lower limits of the crown surface 50 and within the angular specifications to be described more specifically hereinbelow. The effect of a convexly curved spherical crown zone 38 is to provide a portion of crown metal that is greater (thicker) in radial section at any point intermediate the crown end 46 and the side walls 42 or the corners 60 at the outer peripheral edge of the crown surface 50, when measured from such crown surface to its subtending chord.

Attention is also directed to and note should be taken that the flattened areas in each instance, because of the variations implicit in high speed production to which reference has been made above, may contact the convexly curved surface of the crown at a point or line above or below the midpoint of such surface located by a radius or axis normal to the chord subtending the arc of the curve.

Except in the case of the lock nut illustrated in FIGURE 6, the upper and lower ends of the flattened areas do not extend beyond the upper and lower limits of the curved crown surface 50. The effect of the impaction forming the flattened areas in each instance is to move substantially more metal in the intermediate or medial area of the impaction and progressively less at the upper and lower ends or at the perimeter of the impaction.

Referring to FIGURES 7, 8, 9 and 10 more specifically, as the impacting tool is brought downwardly axially upon the convexly curved crown, the intial contact point is approximately midway between the upper and lower ends of the crown, and upon completion of the impacting step, the portion of the flattened areas 52, 54 and 58 substantially in the medial area of the crown zone is effectively deeper than it is at either of the upper and lower ends, and the thrust of metal through the nut body produces deformations in the thread portions 49 such that the impacting thrust results in both some radial and some axial distortion.

The flattened areas 54 in nut 32 extending from the upper crown end 46 to the outer peripheral edge of the crown surface 50 effect an impaction extending substantially transversely across and into the crown radially thereof. The maximum effect of impaction being substantially central of the crown, i.e., in the midzone of the crown, the forces applied to the threads will distort the thread portions 49 adjacent to but below the top thread, with no or relatively insignificant distortion of the top thread. In the nuts 30 and 34, wherein the flattened areas 52 and 56, respectively, are concentrated substantially in the upper portion of the crown 38 and terminate short of and spaced apart from the side walls 42 and the corners 60, the impaction forces are substantially concentrated in the thread portions 49 below the top thread at the crown end countersink 46.

In the nut 36 the flattened areas 58 have their entire perimeters well within the upper and lower limits of the crown surface 50, and the angularity of such flattened areas with respect to the crown curvature and their impaction forces directed to the thread portions 49 will result in thread distortions more significantly below the top thread at the crown end 46 of the nut than in the top thread itself.

Another variable to be considered is the location of the center of the radius of curvature for the crown surface 50. It is preferred and recommended that such center lie within the compass of the nut body, i.e., a portion defined by the outer side walls and/or corners 42 and 60, respectively, and the threaded bore 48.

A further slight modification of the prevailing torque locknuts above described and illustrated in drawing FIGURES 4 through 11, inclusive, is the locknut 70 illustrated in fragmentary radial section only in FIGURE 12. In this form, the convexity of the crown surface 72 takes the form of a hyperbola, in which the legs of the crown curve approach a top plane normal to the axis of the threaded bore at the crown end as a horizontal asymptote, and to the side walls 74 of the nut body 76 as a vertical asymptote. In this form of the locknut, the radius of curvature of the crown surface changes most rapidly in the area about midway between the threaded bore 78 and the side walls, i.e. adjacent the axis of the curve, so that the flattened areas 80 substantially normal to the axis of the curve provide a substantially greater depth of penetration into the nut body than occurs with a crown surface having a relatively uniform radius of curvature as shown in any of the views illustrtated in FIGURES 4 through 11, inclusive. Alternatively, the convexly curved crown surface may take the form, in radial section, of a parabola or of a 90° segment of a circle, where required or desired to effect specific torque and locking characteristics through impaction of the crown surface.

It will be understood, of course, that modifications of the features of the flattened areas and the convexly curved spherical zone crown may be made to produce lock nuts of particular specification, such combination of features depending upon the physical specifications and requirements for their special applications, the configuration, attitude, depth and compass of the flattened areas having direct relationship to the locking torque desired or required.

The impaction of flattened areas, as disclosed above and illustrated in FIGURES 4 through 12, inclusive, is a movement of metal in the crown zone of the nut intermediate that varies from an indentation into such crown zone, by penetration of the crown zone surface, only in the degree of impaction. Whereas the flattened area results from an impaction that does not pierce through the crown surface and thus leaves the perimeter of the flattened area substantially flush with the crown zone surface, the indentation is impacted into the crown zone to such an extent that side walls, to a greater or lesser degree, extend from the major base plane of the indentation to the crown zone surface. Insofar as this invention is concerned, the impaction of a flattened area or of an indentation is a variation only in the degree of impaction.

Figure 19:
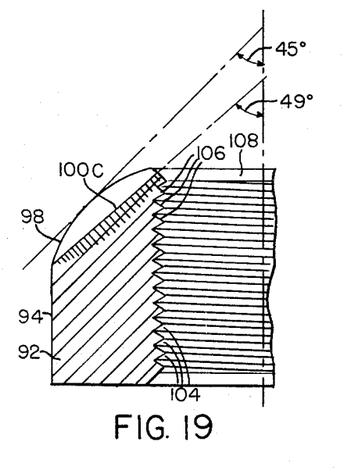
FIGURE 19 is a fragmentary vertical radial sectional view showing a slightly modified attitude of the indentations in either of the locknuts illustrated in FIGURES 13 and 16.

Referring next to FIGURE 13 which is a view in perspective of another embodiment of a prevailing torque locknut of this invention, it may readily be seen that the impaction in the convexly curved crown portion does not extend more deeply into the nut body at either of its upper and lower extremities than it does at the area in between. In this particular instance, the indentation extends from the outer periphery of the nut body at the side walls to the peripheral edge of the threaded bore. Moreover, as shown in FIGURE 19, the indentation may extend to and communicate with the countersink and even, in some instances, to include some minor distortion of the topmost thread. Where the indentation does result in some distortion of the first thread (such cases being encountered for the most part when the indentation occurs at the point of thread runout), the indentation has generally less than and no greater penetration at the thread area than at a point approximately midway of the crown portion. It will be noted that in the embodiment shown in FIGURE 13, the indentation occurs midway of the wrenching flats of the nut body. FIGURE 16 shows a prevailing torque nut in perspective that is similar in all respects to that shown in FIGURE 13, except that the indentations occur at the corners of the nut body.

Although the radial or horizontal cross sectional area through the corner of a nut having such convexly curved crown is greater than the radial or horizontal cross sectional area through the midpoint of a wrenching flat, the difference in area and function are relatively slight. It is not intended, however, that the indentations may occur indiscriminately at the corners or at the midpoint of the wrenching flats from one succeeding nut to the other, it being necessary to adjust the contour and attitude of the crown portion in order to accommodate either case; but it is to be understood that when radially disposed indentations in such convex crown are described, such indentations may be made at the midpoint of the wrenching flats or alternatively at the corner areas of the nut body without departing from the spirit and purpose of this invention.

FIGURE 15 shows a vertical section taken through the indented areas of a prevailing torque lock nut of this invention and relates to the embodiment shown in perspective in FIGURE 13, or the embodiment shown in perspective in FIGURE 16. Here, an optimum condition is illustrated, wherein the attitude of the convexly curved crown surface is substantially parallel or identical to the attitude and posture of the indentations. As was mentioned previously, the variance on either side of this optimum condition, as shown in FIGURES 17 and 18, in a large volume production run of nuts, produce very little difference in the point of origin or the direction of forces resulting from the advent or penetration of the indenting tool.

While the embodiments shown in the various drawings that are a part of this specification deal with a prevailing torque locknut that has a convexly curved crown portion in which the attitude of the subtending angle approximates 45°, or a 90° included angle, the principles of this invention will apply to and be effective in any prevailing torque locknut of a special nature or that is intended to be applicable for special requirements of a specific usage or application. I refer in particular to such prevailing torque nuts as are used to retain the valve operating rocker arms in gasoline-fired internal combustion engines. Such prevailing torque lock nuts have a much greater height than those designed and intended for general purpose usage and include a crown portion that is considerably steeper, describing an included angle of some 75°. In each of such special applications, the lock nut intermediate is manufactured in accordance with specifications for a particular height and angular relationship for the crown portion, and the indenting tool is therefore also designed and made in accordance with the same requirements. Regardless of the angular attitude or relationship of the crown portion that is requisite to the performance of a specific application, the spirit of this invention is fulfilled by a crown portion that presents an outwardly extending curved convexity which is impacted by a tool having indenting portions that produce a straight line (major base plane) indentation contour with respect to the curved surface of the crown.

Referring more specifically now to FIGURES 13 through 16, inclusive, the prevailing torque locknut 90 comprises a nut body 92 having flats or side walls 94 which form corners 96, a convexly curved crown zone 98 having a substantially uniform radius of cross-sectional curvature, a plurality of indentations 100 at substantially the midpoint of the side walls 94 (FIGURE 13) or indentations 102 at the corners 96 (FIGURE 16), a threaded bore 104 having thread portions 106 deformed as a result of the impaction of the indentations 100 or 102, a countersink 108 at the crown end of the threaded bore, and a base 110 at the bottom end of the nut.

The indentations 100 or 102 are made in the crown zone 98 in each instance by an impacting tool having lugs therein arranged circumferentially of the tool so that axial impaction upon and into the crown surface produces such spaced apart indentations, which extend from the crown end or countersink 108 to the outer peripheral edge of the crown surface at the side walls 94 (FIGURE 13) or to the corners 96 (FIGURE 16).

Although the plurality of indentations in the locknuts illustrated in each of FIGURES 13 and 16 are three in number, it is of course to be clearly understood that such plural number may be more or less than three. Further, although the indentations 100 or 102 are shown to have their radially inward edges at or adjacent the countersunk crown end 108, it is to be understood that these indentations can be formed to penetrate slightly into the crown end or countersink as is shown in the fragmentary view of FIGURE 19, without materially or significantly modifying the concept of the invention in the production of torque or physical characteristics of the locknuts produced when compared to such characteristics in the lock nuts having the indentations 100 and 102 lying substantially flush with the countersink, as illustrated in FIGURES 13 and 16.

The convexly curved crown locknut of this invention provides for a permissible variation in the posture of the indentations in relationship to the attitude of the convexly curved crown surface. This is more clearly illustrated in FIGURES 17 and 18. In the underfill condition illustrated in FIGURE 17, wherein the attitude of the crown surface is at an included angle less than the 90° included angle of the indenting tooling, it will be observed that the indentations 100a are formed above the midpoint of the convexly curved crown surface 98a. However, even in this instance, although the top thread may be very slightly deformed, the greater penetration of the crown surface takes place at a distance from the crown end or the countersink 108 so that the maximum effective distortion takes place at thread portions 106 somewhat below the top thread of the threaded bore 104. Where overfill of the nut intermediate tooling occurs, we would find a locknut having the structure substantially as illustrated in FIGURE 18. In this structure, the indentations 100b are disposed at the outer peripheral edge of the crown surface 98b adjacent the side walls 94, and the distorted thread portions 106 now lie somewhat further below the top crown end of the threaded bore 104. Yet, in either instance of an underfill or overfill condition, the impaction of portions of the convexly curved crown occurs across the entire range of the crown from its upper periphery adjacent the countersink to its lower periphery adjacent the side walls of the nut body, producing thread deformation and resultant locking torque values within acceptable permissible limits.

A slight modification of the structure illustrated in FIGURES 13 and 16 is that shown in FIGURE 19 of the drawings, in which the radially inward end of the indentations 100c penetrates into the countersink 48, thus giving a very slight distortion to the top thread at the countersink. As has been explained above, in high speed and large volume production, where underfill, overfill and/or tool wear conditions exist, the optimum structures illustrated in FIGURES 13 and 16 are often subject to some variation, and penetration of the countersink can occasionally occur. In fact, in some instances where greater initial locking torque is required, penetration by the indenting lugs into the countersink is purposely effected, and in such cases a portion of the top thread as well as lower thread portions 106 are deformed to produce the required initial higher locking torque characteristics.

Depending upon the particular applications to which prevailing torque locknuts of the instant invention may be applied, the indentations in the convexly curved crown surface can be foreshortened, thus concentrating the effective impaction toward the upper or the lower peripheral edge of the crown surface. As an examplary embodiment of such locknut, illustrated in FIGURES 20–23, inclusive, the nut 110 comprises a body 112 having side walls 114 forming corners 116 therebetween, a convexly curved crown zone 18 extending from the side walls to the crown end formed by the countersink 120 at the upper end of the threaded bore 122, a nut base 124, and a plurality of indentations 126 spaced substantially symmetrically about the crown zone surface 118. These indentations 216 are foreshortened and terminate radially outwardly at edges 128 that substantially blend into the crown zone surface 118. The radially inward edge 130 of these indentations, in the form of locknut 110 illustrated in FIGURES 20, 21 and 22, penetrates slightly into the countersink 120 as well as into the crown surface 118. Thread portions 132, distorted by the indentations 126, lie closely adjacent the upper end of the crown and the countersink 120. It will be recognized that in this form of a prevailing torque lock nut of this invention, the depth of penetration of the indentations into the crown surface is somewhat less than is present in the fully extended radial indentations 100 or 102, FIGURES 13 and 16, wherein the thread deformation or distortion is more broadly based.

Figure 20:
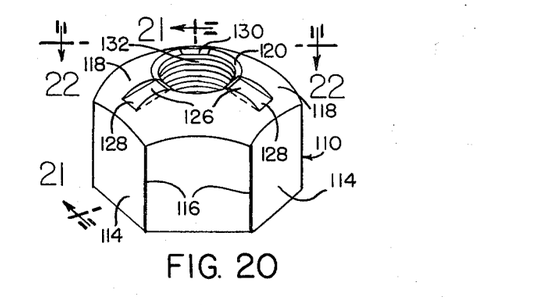
FIGURE 20 is a perspective view of a slightly modified form of the locknut illustrated in FIGURE 13.
Figure 21:
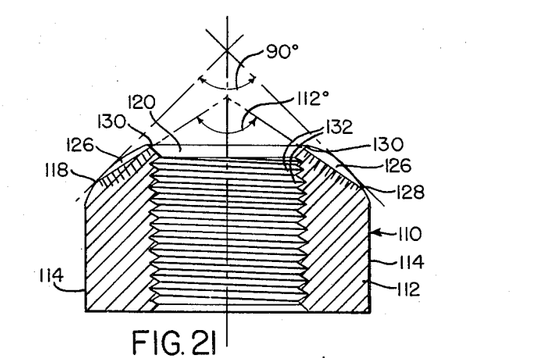
FIGURE 21 is a vertical radial sectional view taken substantially on the line 21—21 of FIGURE 20.
Figure 22:
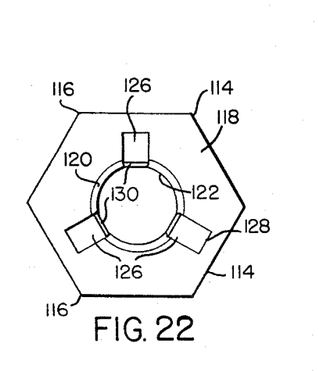
FIGURE 22 is a top plan view taken substantially on the line 22—22 of FIGURE 20.
Figure 23:
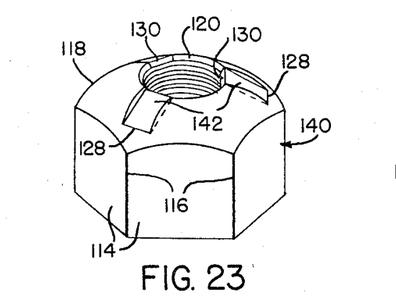
FIGURE 23 is a perspective view of a slightly modified form of the locknut illustrated in FIGURE 16.

In the modified lock nut 140, illustrated in FIGURE 23, significant variations from the lock nut 110, FIGURES 20–22, include the disposition of the indentations 142 in a radial relationship to the corners 116 of the nut body 112, and the disposition of the radially leading edge 130 of the indentations 142 substantially coincident with the countersink 120 at the top of threaded bore 122. In all other respects, the locknut 140 is substantially identical with the lock nut 110.

Figure 24:
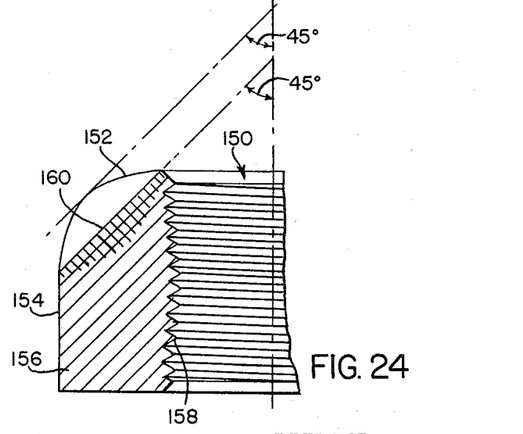
FIGURE 24 is a transverse fragmentary vertical sectional view of a locknut having a convexly curved crown, similar to either of the locknuts illustrated in FIGURES 13 and 16, except that the convexity or curvature is substantially in the form of a hyperbola, wherein the lateral legs of the curve approach asymptotes which comprise the horizontal plane at the top crown end of the nut and the vertical planes of the side walls at the lower or peripheral edge of the crown, and wherein the intermediate portion of the curve has a changing radius of curvature substantially according to a hyperbolic equation.

A further slight modification of the prevailing torque locknuts above described and illustrated in the drawing FIGURES 13 through 23, inclusive, is the locknut 150 illustrated in fragmentary section only in FIGURE 24. Here, the curved convexity of the crown surface 152 takes the form of a hyperbola, in which the legs of the curve approach a top plane normal to the axis at the crown end, as a horizontal asymptote, and to the side walls 154 of the nut body 156 as a vertical asymptote. In this form of the locknut, the radius of curvature of the crown surface changes most rapidly in the area about midway between the threaded bore 158 and the side walls, i.e., adjacent the axis of the curve, so that indentations 160 substantially normal to the axis of the curve provide a somewhat greater depth of penetration into the nut body when occurs with a crown surface having a relatively uniform radius of curvature as shown in any of the views illustrated in FIGURES 13 through 23, inclusive. Alternatively, the convexly curved crown surface may take the form, in radial section, of a parabola, or of a 90° segment of a circle, where required, or desired.

The effect of the impaction forming the indentations 100, 102, 126, 142 and 160 in a convexly curved crown zone is to move more metal at the intermediate or medial portion of the indentations and progressively less toward and at the upper and lower peripheral edges of the indentations. As the impacting tool is brought into engagement axially with the convexly curved crown, the initial contact point for the tool lugs forming the indentations 100 and 102 is approximately midway between the upper and lower peripheral edges of the crown, and upon completion of the indenting operation, the medial portion of the identations is effectively deeper than it is at either of the upper or lower ends. The resultant thrust of metal through the nut body produces thread deformations having both some radial and some axial distortion. Similarly, the penetration into the crown zone of the foreshortened indentations 126 and 142 provides a greater thrust and movement of metal medially of these indentations than at their upper edges adjacent to or partially into the crown end countersink 120 or at their lower edges 128 where such edges blend into the crown zone surface 118. The thread deformation resulting from the impaction of the indentations 126 and 142 will be generally as illustrated in FIGURE 21, if the upper edge of the indentations lie partially in the area of the countersink, as is illustrated in FIGURES 20 and 22. If the upper edge of the indentations 142 just reach or are adjacent to the crown end of the countersink, as in FIGURE 23, then there will be only very slight, if any distortion or deformation of the top thread, the main thrust of the impacting forces resulting in thread deformations substantially below the top thread. Although the foreshortened indentations 126 and 142, as illustrated in FIGURES 20–23, are shown generally adjacent the crown zone and 120, such indentations may be disposed anywhere between the upper and lower peripheral limits of the crown zone.

While the geometry relating to the location of the midpoint on the curve of the crown and its centerpoint is about the same for each standard size of locknut, the length of the radius is usually different for each size. As an example, a ¼ inch radius was found to be suitable for the convexly curved crown surface of a ⅜ inch tapped size locknut having a hexagonal configuration with ⁹⁄₁₆ inch across the flats. Smaller tap sizes would have correspondingly shorter lengths of radius, while larger tap sizes would require longer ones.

Where the convexly curved crown surfaces are at attitudes somewhat at variance with the 90° included angle of the indenting lugs of the impaction tool, as in FIGURES 17 and 18, the first contact of the tool lugs will be made below the midpoint of the curved surface (FIGURE 18) producing a slightly greater radial effect, or above the midpoint of the crown surface (FIGURE 17) producing a slightly greater axial effect. The crown curvature illustrated in FIGURE 18 will occur more frequently when low carbon steels of grades A and B are used, because the metal is softer, can be compressed more easily, and has less springback than the harder or hardened steels which comprise grade C. The latter steels, having more springback and greater resistance to impaction of the crown forming tool, will sometimes produce the crown configuration of FIGURE 17.

It will, of course, be noted that the convexly curved crown of the locknuts of this invention provide substantially more metal intermediate the crown's upper and lower peripheral limits, for impaction and resultant thread deformation, than is provided by a straight tapered crown. It will further be understood, of course, that modifications of features of the nut body, indentations and the convexly curved crown zone may be made for particular locknuts and their special applications, such modifications depending upon the physical characteristics, specifications and requirements of their special applications, the configuration, attitude, depth and area of the indentations having direct relationship to the locking torque desired or required. In this connection, the bottom surface of the impactions, whether flatened areas or indentations, is preferably planar so as to reduce the variables for effective production control and to obtain the functional benefits of a convexly curved crown, wherein the impaction moves more metal at the point where the impacting lugs of the tool, moving axially, first meet the crown surface and to effect a greater radially inward force component substantially in the central or medial area of the convexly curved crown zone than is produced at the upper and/or lower peripheral extremities of the crown.

It will also be noted from the description given above that the radius of curvature of the convexly curved crown surface is variable. Such radius of curvature is generally greater as the size of the nut body increases, yet smaller radii of curvature with more elongated crowns can be used to substantially the same effect. Although the drawings and the description above generally disclose a convexly curved crown surface having a subtending chord angle substantially in the range of about 45° with respect to the vertical axis of the nut, it will be understood that such crown curvature can be made with other attitudes and that this disclosure is not limited to such single angularity. A range of convexly curved spherical zone crown attitudes considered operable for the production of these prevailing torque locknuts is from about 60° to about 110° included angle with repsect to the axis of the nut, defined by chords subtending the convexly curved crown portions in the nuts above described. Further, the angular attitude of the axially directed impacting tool lugs which form the resulting impactions can be adjusted and modified to suit the requirements of particular locknut torque specifications. Such angular attitudes of the impactions with respect to the axis of the nut can be less than or greater than the 45° angle (90° included angle) of the impaction surface described and illustrated in the several views of the drawings. Another variable to be considered is the location of the center of the radius of curvature for the crown surface. It is preferred and recommended that such crown zone center lie within the compass of the nut body, i.e., the portion defined by the outer side walls and/or corners, respectively, and the axis of the threaded bore, though special locknut requirements may dictate such center to lie beyond the compass of the nut body.

While the attitude of the convexly curved crown surface may change and vary due to die and tool wear, and to overfill and/or underfill conditions in such tooling, the location of the initial contact point made by the impacting tool lugs as they are driven axially forward against the crown surface will vary only to a very small degree. Therefore, the amount and position of thread deformation in the threaded bore—which is the desired end objective of the impacting and locknut forming process—varies only to a small degree, producing substantially uniform, relatively consistent and reliable prevailing torque values in the locknuts of this invention.

Having described the features of construction of the invention in its simplest terms, it is to be understood that such features may be modified, changed or varied in greater or lesser degree, without departing from the essence of the invention.

I claim:
1. In a prevailing torque locknut designed for large scale porduction of lock nut intermediates on cold heading nut formers, the combination comprising
   a nut body having a threaded bore and a crown zone at one end of said nut body,
   said crown zone having the general shape of a surface of revolution generated by revolving a generally convexly curved line about the axis of said bore,
   said curved line extending from the side walls of said nut body toward one end of said bore,
   said crown zone including a countersunk area at the outer extremity of said threaded bore,
   said crown zone being provided with one or more impactions of crown zone material within said surface of revolution, each of said impactions defining a substantially planar surface,
   said one or more impactions being formed from the initially smooth surface defined by the generation of said curved line whereby the total displaced volume of the material of said crown zone is equal to the volume of said material moved to form said one of more impactions,
   the perimiter of each said impaction lying within the upper and lower limits of said crown zone,
   each impaction being formed in said crown zone to produce a predetermined pattern of internal stress in the material of the nut contiguous with said impaction and a predetermined resultant distortion of the thread portions adjacent to and below the first thread portion at said crown zone end of said bore,
   whereby a greater mass of crown material intermediate the upper and lower limits of said impaction and substantially medially thereof is moved into said crown zone and generally toward said threaded bore than is moved at the upper and lower limits of said impaction, in any radial plane passed through the area of said impaction in said crown zone.
2. A locknut according to claim 1, wherein
a plurality of said impactions are disposed in said crown zone in substantially equally spaced relationship about said bore axis.
3. A locknut according to claim 2, wherein
each said impaction consists of a flattened area having a single continuous surface.
4. A locknut according to claim 2, wherein
each said impaction comprises
   an indentation penetrating into and below said crown zone surface of revolution and comprising
      a major base surface consisting of said substantially planar surface,
      and side walls extending from the lateral edges of said major base surface to said crown zone surface.
5. A locknut according to claim 1, wherein
a plane containing said substantially planar surface intersects said bore axis at substantially at 45° angle.
6. A locknut according to claim 1, wherein
said convexly curved line is a portion of a curve which is substantially circular.
7. A locknut according to claim 6, wherein
said circular portion comprises substantially a 90° segment of a circle.
8. A locknut according to claim 1, wherein
said convexly curved line is a portion of a curve which is substantially hyperbolic.
9. A locknut according to claim 1, wherein
said convexly curved line is a portion of a curve which is substantially parabolic.
10. A locknut according to claim 1, wherein
the chord angle of said crown zone surface of revolution is from about 30° to about 55° with respect to the axis of said threaded bore.

References Cited

UNITED STATES PATENTS

| | | | |
|---|---|---|---|
| 3,208,494 | 9/1965 | Skidmore | 151—21 |
| 3,311,146 | 3/1967 | Storch | 151—21 |

FOREIGN PATENTS 963,110  7/1964  Great Britain.

CARL W. TOMLIN, *Primary Examiner.*

RAMON S. BRITTS, *Assistant Examiner.*

PO-1050
(5/69)

UNITED STATES PATENT OFFICE
CERTIFICATE OF CORRECTION

Patent No. 3,441,073          Dated April 29, 1969

Inventor(s) Kenneth L. Johnson, Assignor, by mesne assignments, to Modulus Corporation.

It is certified that error appears in the above-identified patent and that said Letters Patent are hereby corrected as shown below:

Column 11, line 17 (application page 28, line 6) "18" should read -- 118 -- ;

Column 11, line 60 (application page 29, line 20) "when" should read -- than -- ;

Column 12, line 24 (application page 31, line 6) "and" should read -- end -- ;

Column 13, in Claim 1, line 57, "porduction" should read -- production -- ;

Column 14, in Claim 1, line 5, "of" second occurrence should read -- or -- ;

Column 14, in Claim 5, line 41, "at" second occurrence should read -- a -- .

SIGNED AND SEALED
MAR 10 1970

(SEAL)
Attest:

Edward M. Fletcher, Jr.
Attesting Officer

WILLIAM E. SCHUYLER, JR.
Commissioner of Patents